Dec. 31, 1946.    R. R. RANEY    2,413,378
TYING APPARATUS
Filed April 24, 1944    2 Sheets-Sheet 1

INVENTOR.
Russell R. Raney.
BY Paul O. Pippel
Atty.

Dec. 31, 1946.  R. R. RANEY  2,413,378
TYING APPARATUS
Filed April 24, 1944  2 Sheets-Sheet 2

Inventor:
Russell R. Raney.
By Paul O. Pippel
Atty.

Patented Dec. 31, 1946

2,413,378

UNITED STATES PATENT OFFICE 2,413,378

TYING APPARATUS

Russell R. Raney, La Grange, Ill., assignor to International Harvester Company, a corporation of New Jersey Application April 24, 1944, Serial No. 532,441

1 Claim. (Cl. 100—20)

This invention relates to a new and improved tying apparatus. More specifically, it relates to a tying apparatus for a baler. Knotting mechanisms have been used with binders for many years, but it has been just recently that they have been applied to pick-up balers.

A binder forms bundles of hay or straw, and when the bundles attain a predetermined size, the tying mechanism is actuated, and immediately upon completion of the knot the bundles are forced from the binder deck by discharge arms thereupon causing an immediate stripping of the knot from the tying mechanism.

A baling machine includes a baling chamber and a plunger for compressing the hay or straw within the baling chamber, and upon the bale reaching the desired size, the tying mechanism encircles the bale with twine and then proceeds to knot the ends thereof. However, from this point forward, the baler mechanism differs from that of the binder mechanism. There is no positive means for discharging the formed bales from the baling chamber such as the discharge arms on the conventional binder machines. In other words, the discharge of the bale is accomplished only by the formation of a new bale with the result that the first made bale is forced out of the chamber. The speed at which the discharge of the bales occurs depends upon the quantity of hay or straw or the like which is fed to the machine. If this supply of hay or straw is slow and/or small, the discharge of the previously made bale will likewise be slow. Inasmuch as the stripping of the knot made by the tying mechanism depends upon the discharge of the bundle or bale in both the binder and the baler, it will be evident that the lack of positive discharge means for the baler will permit the knot to remain on the tying mechanism, while the tying needle returns and lays down a new length of twine in preparation of the succeeding bale to be formed.

The primary object of the invention is to provide an improved binding mechanism for the purpose stated.

It is also an important object of this invention to provide a means for holding a new strand of twine for a succeeding bale, in formation in the press, off the tying mechanism while a preceding bale is being tied.

Another object of the invention is to maintain the twine for a new bale in a position away from the knot of the preceding bale while that knot is not yet stripped from the knotting mechanism.

Other and further important objects will become apparent in the disclosure in the following specification and drawings, in which.

As shown in the drawings.

Figure 1:
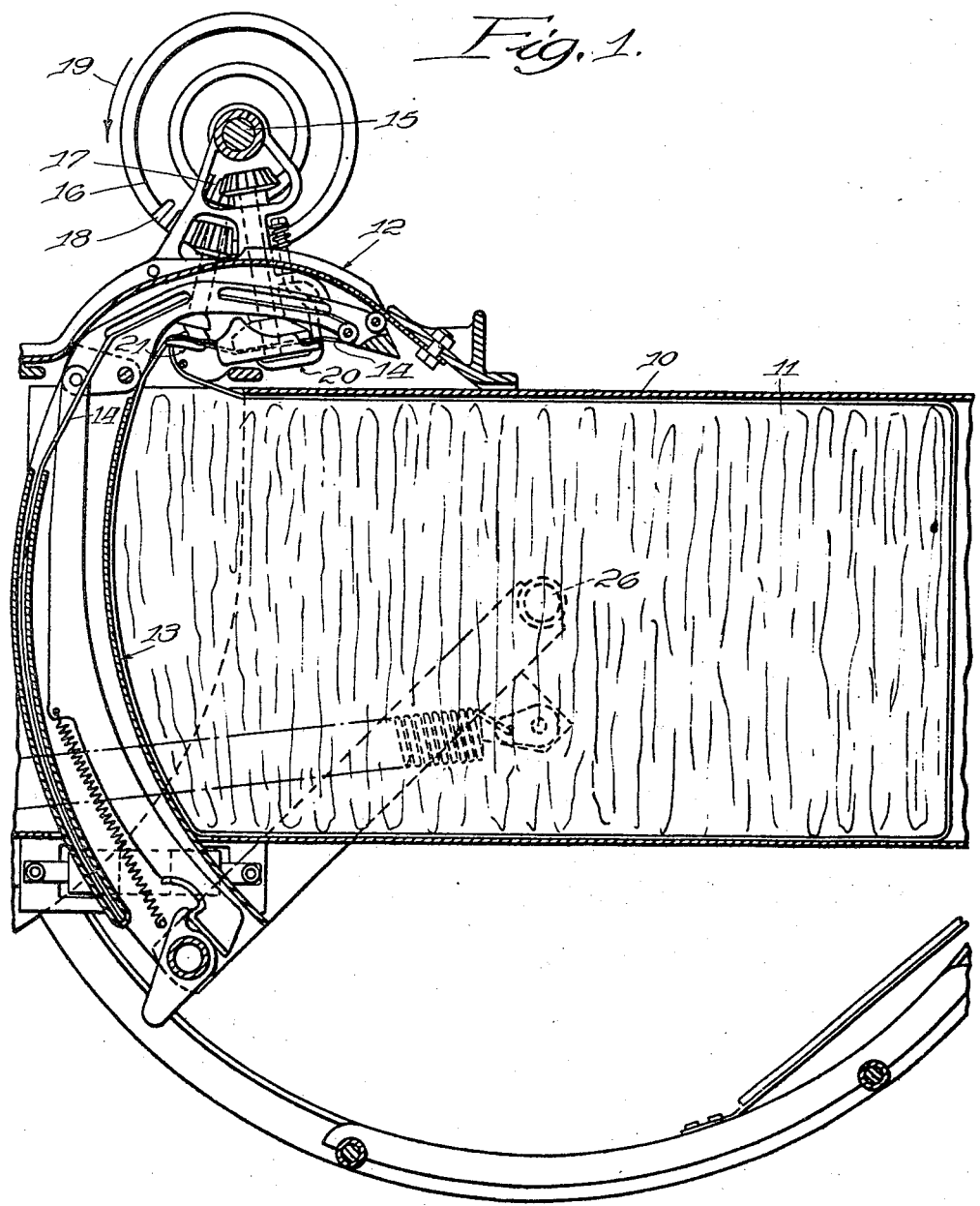
Figure 1 is a vertical sectional view showing a baler tying mechanism.

The reference character 10 designates a horizontal bale chamber through which hay, straw or other material 11 is being compressed and formed into bales. The baler of this invention is shown more completely in my copending Patent No. 2,403,396, issued July 2, 1946, and also the copending application of Crumb et al., Serial No. 466,460, filed November 21, 1942.

A tying mechanism 12 is positioned on top of the bale chamber 10 and, in conjunction with an arcuate partially hollow needle 13, carries the strand 14 therewithin. The strand may be twine, wire, or any flexible strip of material. The strand 14 proceeds upwardly through the needle from a source of twine (not shown). The knotter 12 includes a shaft 15 which carries a disk-like member 16 having an inner segmental gear portion 17 and an outer segmental gear portion 18. The disk member 16 is driven in a counter-clockwise direction as indicated by the arrow 19 in Figure 1. The means for driving the disk member 16 is not shown as it forms no part of the present invention. The particular drive means employed is shown in greater detail in my copending application mentioned above.

The tying mechanism 12 further includes a strand holding mechanism 20 and a rotatable bill-hook 21. These elements are shown in detail in Figures 2 and 3. The strand holder 20 is old per se as evidenced by the patents to Benjamin, Nos. 741,296 and 865,754. The holder comprises a stationary plate member 22 which has an upwardly extending annular flange 23 of varying height, a rotor 24, and a stationary knife 25. Projecting upwardly from the rotor 24 is a shaft 28, the end of which is supplied with a bevel gear 29 which engages the internal gear portion 17 on the member 16. The strand holder 20 performs the function of holding an end of the strand during formation of a bale, receiving additional strand from the needle 13 and holding the additional strand during formation of a knot with the first strand. The holder performs still further functions, that of rotating the knotted strands into the knife blade 25 and that of holding a strand being laid for the formation of a new bale. After the bale reaches a predetermined size, the tying of the bale occurs and is shown in the drawing throughout its several progressive stages. Figure 1 shows the needle 13 rotated about its central pivot 26, up over the end of the newly formed mass of hay or straw, over the bill-hook 21 and over the strand holder 20 laying the strand 14 into a notch 27 in the rotor 24. While the needle 13 is shown in the position of Figure 1, after it has laid a strand 14 in the notch 27, it remains in such position while the rotor 24 rotates thereupon causing a gripping of the newly laid strand 14 by the rotor. Simultaneously, with the gripping of the strand by the holder 20, the bill-hook 21 over which the two strands now lie will also rotate.

Figure 2:
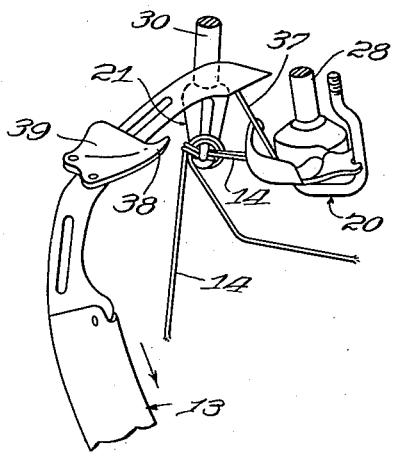
Figure 2 is a perspective view of one position of the novel tying means in this invention.
Figure 3:
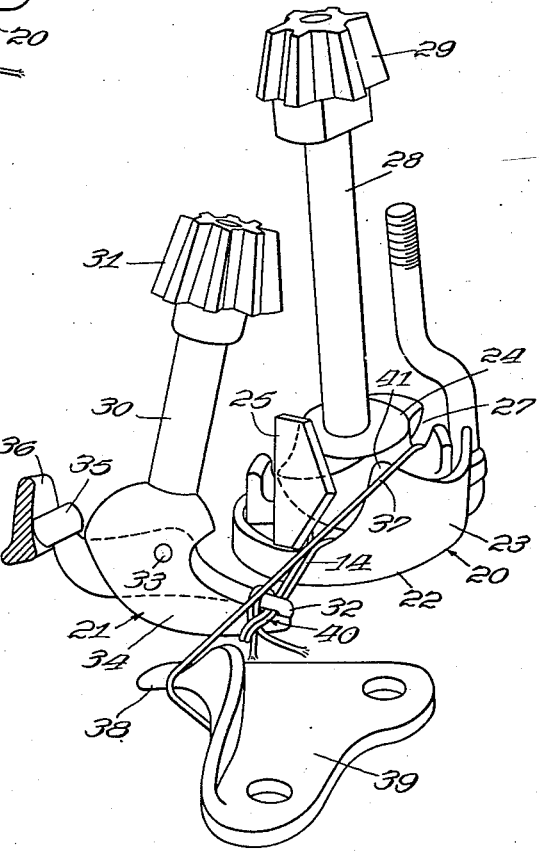
Figure 3 is another perspective view of a portion of the tying means in a position succeeding the position as shown in Figure 2.

As shown in the drawings, the bill-hook 21 is provided with an upwardly extending shaft 30, the upper end of which terminates in a bevel gear 31 which operatively engages the external gear portion 18 on the driven member 17. The bill-hook proper is equipped with a jaw member 32 pivotable at 33 on the lower stationary jaw member 34 of the bill-hook 21. The upper movable jaw 32 has secured to it a follower 35 engaging a cam 36. The functional operation of the bill-hook 21 is described more fully in the previously-mentioned Benjamin patents. As the bill-hook 21 revolves, it causes a twisting of the strands and when the jaws of the bill-hook open, as provided by the follower and cam 35 and 36, respectively, a pair of the twisted strands pass between and are subsequently clamped therein. At this point the needle 13 begins its rearward or downward travel as shown in Figure 2, laying a new strand of twine 37 from the cord holder over the bill-hook and down around a guide finger 38 forming part of a breast plate 39 positioned on top of the baling chamber 10. As shown in Figure 3, the newly laid strand lies above the bill-hook 21 and over the previously made knot 40 not as yet stripped from the bill-hook 21. A hump 41 is provided on a side wall 23 of the twine holding plate 22. The newly laid strand of twine 37 is positioned relatively close to the top of the hump 41, thereby assuring a position of the strand of twine 37 above and clear of the bill-hook 21 when it is pulled down around the guide finger 38. The hump 41 is the important difference between the present knotter and the knotters heretofore made.

As previously stated, there was no need in binders to have the additional newly laid strand of twine such as 37 above and off the bill-hook 21 as the binder knot was immediately stripped from the bill-hook upon its being made before the new strand was laid over the bill-hook. In a baler, however, it has been pointed out that the knot is not immediately stripped from the bill-hook, and when the twine is pulled down over the bill-hook and thus also pulled down onto the knot, it interferes with the normal stripping of the knot. When the knot did come off the bills, it often severed the twine or pulled the twine out of the cord holder. Consequently, it was important that a means be devised for holding the twine above the bill-hook while the next bale was forming so that the previously formed knot could be stripped at any time without danger of fouling the newly laid twine. The hump 41 accomplishes this desired end. This newly laid twine 37 extends directly from the back of the hump 41 to the breastplate finger 38, and twine is not permitted to pass over the hump until the next knot cycle begins and the cord holder motion moves it on around and under the knife 25.

At the present time, the necessity for maintaining a newly laid strand of twine above the bill-hook is only associated with the baler. However, it is possible that future applications of the knotter will require this same construction, and, with that in mind, it is the intention to limit the invention only within the scope of the appended claim.

What is claimed is:

In a baler comprising a bale tying mechanism, said tying mechanism including means for the encircling of a bale with a tying strand, a strand holder, a breast plate fixedly attached to the baler, a knotter for forming a knot with strand ends, movement of the bale subsequent to the formation of the knot acting to strip a knot from the knotter, said encircling means being operable to lay a strand for a succeeding bale to be formed over the knotter and onto the strand holder prior to the knot stripping operation following tying of the previously made bale, means for holding the strand for the succeeding bale out of interfering engagement with the knot being formed and during stripping thereof, and said last-named means comprising in combination a hump on said strand holder and a guide finger on said fixed breast plate.

RUSSELL R. RANEY.